United States Patent [19]

Severson

[11] 4,290,298
[45] Sep. 22, 1981

[54] SYSTEM FOR IN SITU METER TESTING

[75] Inventor: Asbjorn M. Severson, Minneapolis, Minn.

[73] Assignee: Honeywell Inc., Minneapolis, Minn.

[21] Appl. No.: 123,584

[22] Filed: Feb. 22, 1980

[51] Int. Cl.³ .......................................... G01F 25/00
[52] U.S. Cl. ............................................................ 73/3
[58] Field of Search ...................................... 73/3, 201

[56] References Cited

U.S. PATENT DOCUMENTS 3,187,551  6/1965  Hill ............................................. 73/3
3,444,724  5/1969  Gilpin ....................................... 73/201

Primary Examiner—S. Clement Swisher

Attorney, Agent, or Firm—Charles G. Mersereau

[57] ABSTRACT

A system for in situ testing of fluid meters is disclosed in which a single dual-position valve is disposed in series with and downstream of the meter to be tested in the supply line. In the first position, the inlet and outlet openings of the valves are such that a fluid is enabled to pass straight through the valve along the supply line and in a second or test position, the upstream and downstream openings of the supply line to the valve are in communication with auxiliary ports not connected with each other enabling a test or calibration unit to be connected in series with the auxiliary test ports. In this manner, testing of the meter is accomplished without interruption of the gas supply to the user.

7 Claims, 4 Drawing Figures

SYSTEM FOR IN SITU METER TESTING

CROSS-REFERENCE TO RELATED APPLICATION

Reference is made to a related application Ser. No. 123,585 by A. Noel J. Pearman entitled "System for In Situ Meter Testing," filed of even date and assigned to the same assignee as the present invention now U.S. Pat. No. 4,271,694. By that invention two 4-way valves and a by-pass line are utilized in conjunction with a meter such that with the valves in one position all the supplied gas flows through the meter and, with the valves in the alternate position, the entire flow of gas is through a bypass system completely isolating the meter thereby allowing the meter to be calibrated through test ports by portable equipment without interrupting the flow of gas to the user. Thus, that invention contemplates a complete bypass of the meter to be calibrated during the calibration sequence.

The present invention, on the other hand, contemplates a re-routing of the entire flow of gas downstream of the gas meter through test equipment. The gas may be returned to the line of the user or stored or vented, in which case an alternate supply of gas is used to maintain service to the user while calibration or other testing is being accomplished. This system contemplates a single dual-position valve.

BACKGROUND OF THE INVENTION

1. Field of the Invention

The present invention relates generally to the calibration of fluid meters and, more particularly, to a system to permit in situ calibration of small gas meters such as household meters.

2. Description of the Prior Art

In the prior art, large commercial or industrial gas meters have conventionally been provided with test ports in the meter which are accessible for calibration and verification of the meter while the meter is still in service. However, small capacity meters such as those associated with residential installations, have not been provided with any means of calibrating the meters while in use. In order to calibrate the conventional residential or other small gas meter, it has heretofore been necessary to remove the meter from the line, replace it with a previously calibrated meter, and to conduct the meter testing at a remote location. This has been done on a regularly scheduled basis, for example, every five years, by most gas utility companies at great expense. Many of these meters have needed only a simple verification or minor adjustment which could easily have been accomplished if the meter could have been checked in situ without interruption of the gas supply to the customer.

Ultrasonics is one approach that has been tried successfully for the measure of liquid flow in regard to verifying or calibrating liquid meters. However, because of power transmission losses at the boundary layer in gaseous flow, the technique of attaching ultrasonic probes to the gas pipes introduces errors which have not allowed this technique to be used successfully in that regard. Thus, there exists a definite need for the ability to verify and calibrate a relatively small gas meter such as a residential gas meter in situ without interruption of the gas flow to the consumer.

SUMMARY OF THE INVENTION

According to the present invention, the problem associated with the calibration of small capacity gas meters in situ has been solved by the provision of the unique valving system which, in conjunction with a portable calibration system, can be used to calibrate the meter without interruption of the flow of gas to the user. This system includes a single dual-position valve located in the gas line downstream of the meter. The valve is provided with two auxiliary external calibration or test ports. In the normal or operating position of the valve, the two external ports are closed and isolated from the line and the gas flows straight through the valve in the line in the manner of any open shutoff valve. In the alternate or test position, the gas line is shut off and the entire gas flow re-routed such that all of the gas passing through the meter is diverted through a first port into the testing system where the accuracy of the meter can be checked by direct comparison with a meter calibrating unit or the like. The outlet flow from the calibration system may be re-established in the gas line to the user through the second test port of the dual-position valve. A pump and pressure regulator may be provided to aid in overcoming any pressure losses in the calibration system in maintaining normal flow of the gas through the calibration system to continuously meet the needs of the user.

The dual-position valve may be constructed in the form of a a sliding plug in a cylinder having a straight through port located inward from symmetrical diversion or test ports. The valve is preferably constructed such that as the valve is switched from the normal to the calibration position, the test ports open as the flow in the main gas line is reduced in a manner which allows the testing system to be purged and return flow established so that the flow of gas to the user is not interrupted. The reverse is true when the test sequence is finished and the valve is switched from the calibration position back to the normal position. Here too, the flow of gas through the line should be established as the flow of gas through the test ports is reduced.

An alternate regulated source of fuel gas may be provided to the return test port of the valve through a regulator to continue the supply of gas to the user should it be desirable to vent or utilize other techniques in measuring the quantity of gas flowing through the meter testing system. Quick connecting or other conventional fittings may be provided to connect the calibration system in series with the two external test ports. In this manner the test system can be quickly connected to the test ports of the dual-position valve and the meter calibrated without interruption of service to the user.

BRIEF DESCRIPTION OF THE DRAWINGS

In the drawings wherein like numerals are used to designate like parts throughout the same.

DESCRIPTION OF THE PREFERRED EMBODIMENT

In accordance with the present invention, there is provided a method and apparatus for facilitating the testing of a conventional gas meter without removal of the meter from the line or the interruption of service to the user. A system which can be used in accordance with the present invention is illustrated in FIG. 1.

Figure 1:
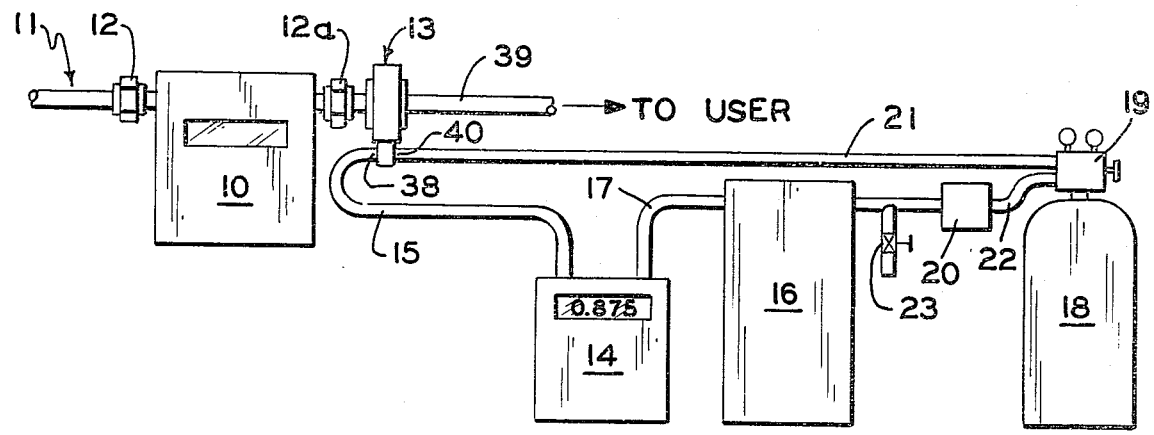
FIG. 1 is a schematic representation of a bypass system in accordance with the invention showing a typical calibration hookup.

Thus, in FIG. 1 there is shown a conventional gas meter 10 attached to the gas supply line 11 between pipe unions 12 and 12a and a valve 13. The valve 13, in turn, is connected to a calibration meter or other test device 14 by means of a line 15 and subsequently to a reservoir 16 through a line 17. A supply of fuel gas or storage cylinder may be provided as at 18 with attached pressure regulator 19 and a pump 20 may also be provided along with a return line 21. The pump is connected to the regulator 19 as by a line 22. A system vent is shown at 23. The operation of this system is explained in greater detail below.

Figure 2:
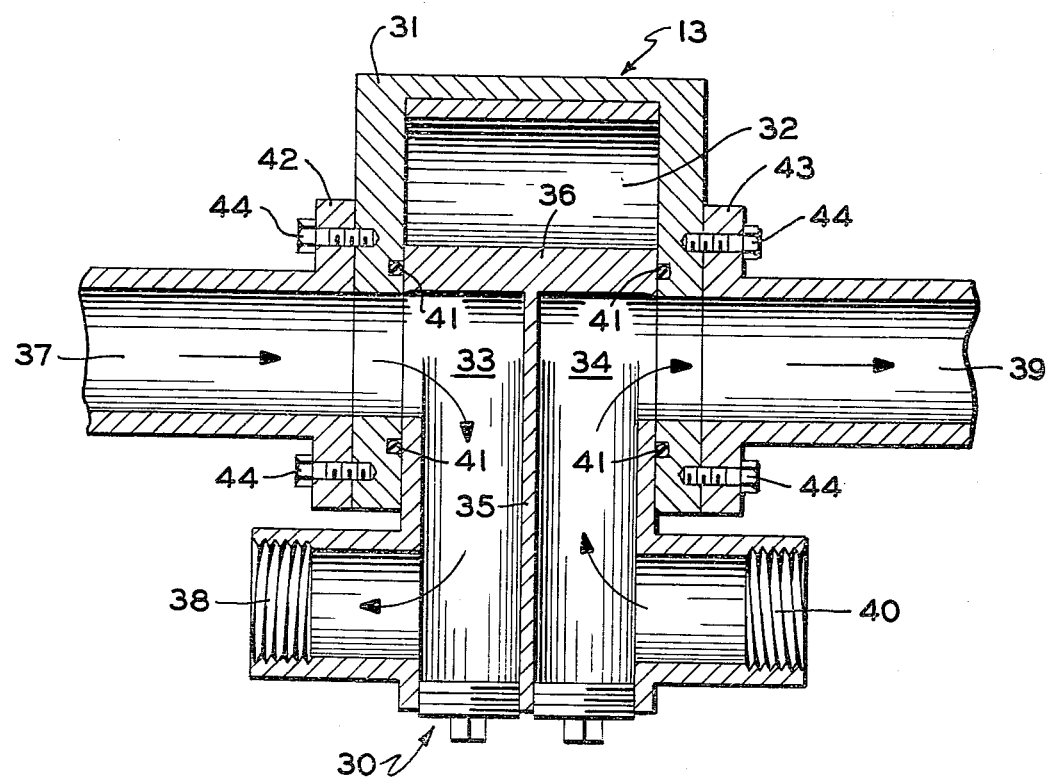
FIG. 2 is an enlarged sectional view of the valve of FIG. 1 mounted in a gas line with the valve in the test position.

FIG. 2 depicts enlarged sectional view of the valve 13 of FIG. 1. The valve 13 includes an internal plug 30 which is movably seated inside the valve body 31. As seen best in FIG. 4, the internal volume 32 described by the valve body 31 may be generally cylindrical in shape. Thus, the sliding plug 30 and the valve body 31 operate somewhat as a cylinder and piston. The plug 30 describes three hollow passages 32, 33, and 34 which may be cylindrical in shape separated by barriers 35 and 36. In the position of FIG. 2, the inlet line segment 37 of the gas supply line 11 is in communication with the hollow passage 33 which in turn communicates with the valve outlet at 38. The outlet segment 39 of the supply pipe 11 is in communication with the hollow passage 34 of the plug 30 and the outlet 40. In this position fluid flowing through the pipe section 37 may be caused to flow out through the port 38 and return or supply fluid to flow into 40, through passage 34 and through pipe segment 39. Thus, direct flow is cut off between the sections 37 and 39.

The plug 30 is sealed in the valve body 31 as by seals 41 which may be conventional valve packing, O-rings, or the like. Valve 13 is conventionally mounted between pipe sections 36 and 38 as by flanges 42 and 43 and secured by bolts 44.

Figure 3:
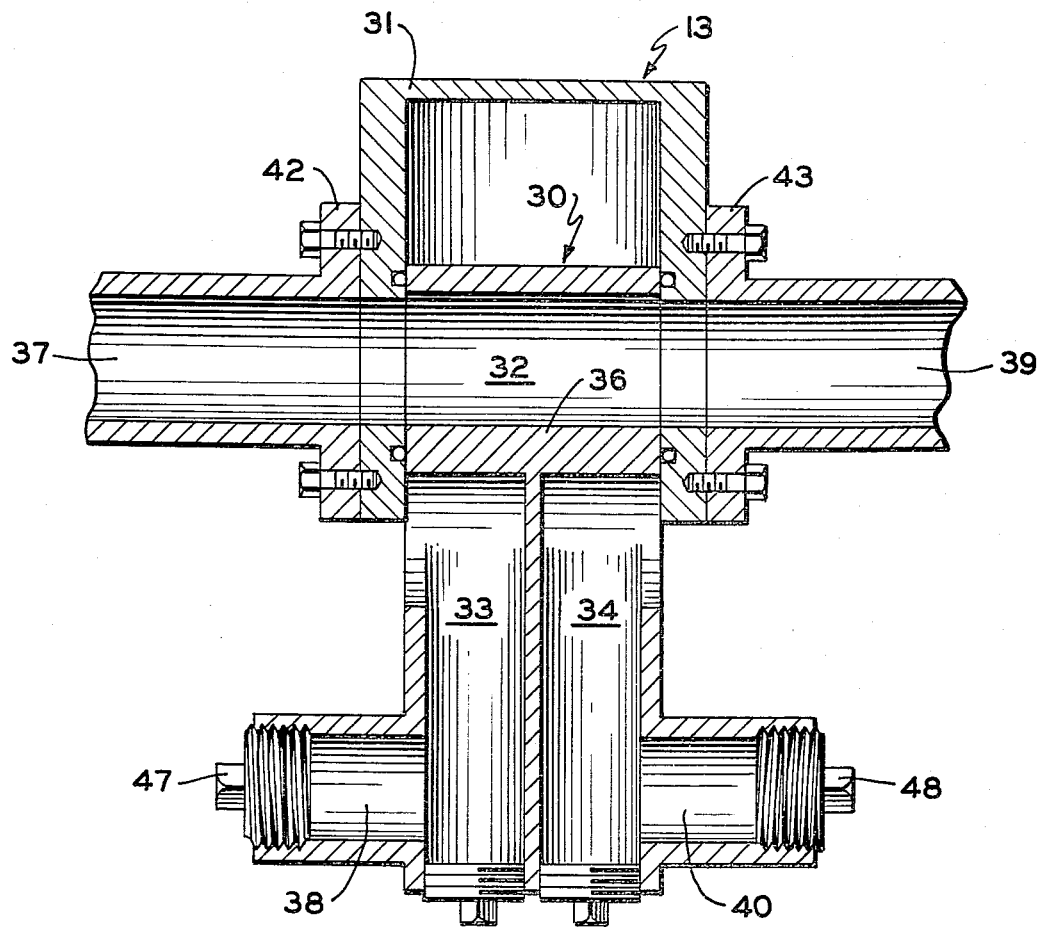
FIG. 3 is similar to the view of FIG. 2 with the valve in the normal or operating position.

The normal operating position of the valve 13 is shown in FIG. 3. In this position, the passage 35 of the plug unit 30 is aligned with the pipe segments 37 and 39 providing a straight through open flow along the pipe 11.

Figure 4:
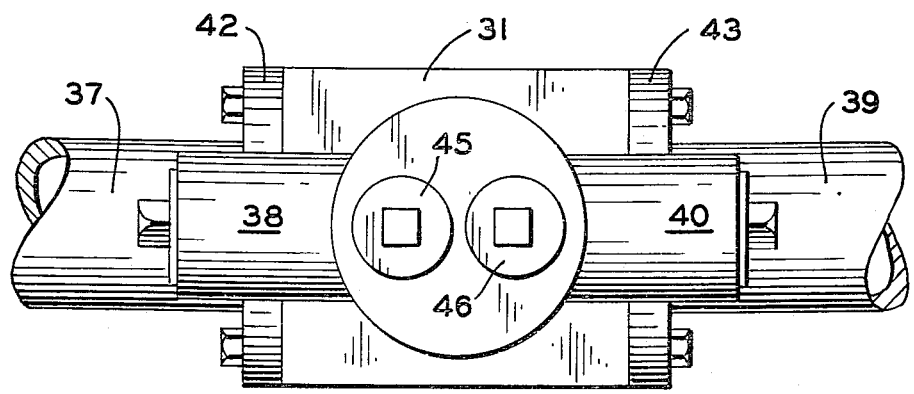
FIG. 4 is a bottom view of the valve of the invention.

As also can be seen in FIG. 4, the passages 33 and 34 may have bottom outlets as at 45 and 46, if desired, to serve as alternative connections to the outlets 38 and 40 of the valve 13. Also, as shown in FIG. 3, the outlets 38 and 40 may be closed as with pipe plugs 47 and 48 when not in use.

In the normal use of the gas supply system, the valve 13 is in the position of FIG. 3 and the gas flow is through the gas meter 10, valve 13, and into the gas consuming device of the user. When it is desired to calibrate or test the meter 10, lines 15 and 21 of the calibration system are attached to the valve at 38 and 40, respectively. After the lines have been attached, the plug 30 of valve 13 may be moved into the position of FIG. 2 so that the testing may take place.

It can readily be seen from FIGS. 2 and 3 that as the plug 30 is moved from the position of FIG. 3 to the position of FIG. 2, gas flows into the line 15 before it is cut off from the pipe section 39 such that before the plug 30 is moved completely into the position of FIG. 2, the entire testing system including calibration meter or device 14, volume section 16, pump 20, and line 21 may be purged and filled with gas prior to the point where direct communication between pipe sections 37 and 39 is cut off. Thus, when the valve is fully moved from the position of FIG. 3 to the position of FIG. 2, the gas supply may be maintained to the user through the calibration system. In this manner, the consumption of the user as measured by the meter 10, can be accurately monitored by the metering device 14 without interruption of service to the user.

If the user, at the time of calibration, is using little or no fuel gas, the test may be conducted venting the measured amount of gas as through the vent valve 23 (FIG. 1). If this is done, or for some other reason it is desired to vent the amount of gas required to prove calibration or test the meter 10, the supply tank 18 may be utilized to provide an alternative source of gas through the regulator 19 in line 21 to the user during this interim period such that should the user desire to use a gas appliance or is using a gas appliance at very low flow, the test can still be conducted without interruption of service. Also, the cylinder 18 in conjunction with the pump 20 and regulator 19 may also be used to store gas run through the test system.

An additional feature of the system lies in the ability of a single crew to exchange meters without interruption of gas source when the storage tank test system is used. A defective meter may be immediately replaced thereby reducing the cost necessitated by having another crew return to replace it.

It will be appreciated that the system of the present invention provides a simple, low-cost, practical alternative which allows small gas meters such as residential meters to be tested in situ in an easy manner.

The embodiment of the invention in which an exclusive property or right is claimed are defined as follows:

1. A system for in situ testing of fluid meters comprising:
   a self-contained, dual-position valve disposed in the supply line in series with and downstream of the meter to be tested, said valve having a first position wherein the inlet and outlet openings of the valve are in communication with the upstream and downstream openings of the supply line such that the fluid is enabled to pass straight through the valve along the supply line, and a second position wherein the inlet and outlet openings of the valve are in communication with auxiliary ports not connected with each other; and
   means for connecting said auxiliary ports in series with a test or calibration unit.

2. The system of claim 1 further comprising means for supplying auxiliary amounts of said fluid to said auxiliary valve port connecting said downstream supply line when said valve is in said second position.

3. The system of claim 1 further comprising pump means for returning said fluid passing through said test unit to said supply line through said downstream connecting port.

4. The system of claim 2 further comprising vent means for venting said gas passing through said test unit.

5. The system of claim 1 wherein said valve further comprises a plug operating in a cylinder which can slidably be moved between position one and position two.

6. The system of claim 5 wherein said valve further comprises sealing means for preventing leakage of said fluid from said supply line.

7. The system of claim 1 wherein said fluid passes as in both said first and second positions during the switching said valve between said positions.

* * * * *